US009232345B1

(12) United States Patent
Rencher et al.

(10) Patent No.: US 9,232,345 B1
(45) Date of Patent: Jan. 5, 2016

(54) CLOSE PROXIMITY VEHICULAR DATA TRANSMISSION

(71) Applicant: The Boeing Company, Chicago, IL (US)

(72) Inventors: Robert John Rencher, Normany Park, WA (US); Alimuddin Mohammad, Sammamish, WA (US); Daniel D. McIntyre, Puyallup, WA (US); Depti Patel, Agoura Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/335,503

(22) Filed: Jul. 18, 2014

(51) Int. Cl.
H04B 7/185 (2006.01)
H04W 4/00 (2009.01)

(52) U.S. Cl.
CPC .................................. H04W 4/008 (2013.01)

(58) Field of Classification Search
CPC .............................. H01Q 1/28; H04B 7/18506
See application file for complete search history.

(56) References Cited

U.S. PATENT DOCUMENTS

| 6,816,728 | B2 * | 11/2004 | Igloi | G06F 8/60 455/11.1 |
| 6,954,620 | B2 * | 10/2005 | Rotta | H03G 3/3042 455/115.1 |
| 2002/0019229 | A1 * | 2/2002 | Usher | H04B 7/18506 455/435.1 |
| 2003/0093187 | A1 * | 5/2003 | Walker | B64C 13/20 701/1 |
| 2006/0270354 | A1 * | 11/2006 | de La Chapelle | H04B 7/18506 455/66.1 |
| 2007/0139169 | A1 * | 6/2007 | Mitchell | H04B 7/18506 340/425.5 |
| 2012/0265372 | A1 | 10/2012 | Hedrick | |

FOREIGN PATENT DOCUMENTS

WO 2007050604 A2 5/2007

OTHER PUBLICATIONS

Wikipedia, "Bluetooth," downloaded from <http://en.wikipedia.org/wiki/Bluetooth> on Jul. 18, 2014, pp. 1-29.
Wikipedia, "Near Field Communication," downloaded from <http://en.wikipedia.org/wiki/Near_field_communication> on Jul. 18, 2014, pp. 1-18.
European Patent Office; Extended European Search Report for European Application No. 15176664.9 dated Sep. 8, 2015, 7 pages.

* cited by examiner

Primary Examiner — David Bilodeau
(74) Attorney, Agent, or Firm — Charles L. Moore; Moore & Van Allen PLLC

(57) ABSTRACT

A system and method for close proximity vehicular data transmission may include detecting, by a processor onboard a vehicle, a predetermined condition for activating a short range radio frequency (RF) transceiver onboard the vehicle. The onboard short range RF transceiver is configured to transmit and receive signals within a limited distance from the onboard short range RF transceiver. The onboard short range RF transceiver is activated in response to at least detecting the predetermined condition. A communications link is established between the onboard short range RF transceiver and a predetermined mobile communications device assigned to a particular crew member. Vehicular data is transmitted from the onboard short range RF transceiver to the predetermined mobile communications device.

20 Claims, 7 Drawing Sheets

CLOSE PROXIMITY VEHICULAR DATA TRANSMISSION

FIELD

The present disclosure relates to data transmission, and more particularly to a method and system of close proximity transmission of data associated with a vehicle.

BACKGROUND

Currently methods and systems for moving data off of and onto vehicles in transit, such as commercial aircraft involve high cost infrastructure modifications to ground facilities and aircraft. Additionally, non-standard and varying frequencies are in use among different airports which further exacerbates data transmission from aircraft at terminal gates to airline databases and storage servers/warehouses. Further, the ability to transmit data securely using existing communications systems at various airports may be problematic. Accordingly, there currently is a need for a low cost solution for moving data off of and onto vehicles in transit, such as commercial aircraft and other common carriers, that securely transfers the data without any tampering, interception by unauthorized entities, or transfer to unauthorized recipients or devices, and also insures the validity and authenticity of the origin of the data and that the data is reliable.

SUMMARY

In accordance with an embodiment, a method for close proximity vehicular data transmission may include detecting, by a processor onboard a vehicle, a predetermined condition for activating a short range radio frequency (RF) transceiver onboard the vehicle, wherein the onboard short range RF transceiver is configured to transmit and receive signals within a limited distance from the onboard short range RF transceiver. The method may also include activating, by the processor, the onboard short range RF transceiver in response to at least detecting the predetermined condition and establishing a communications link between the onboard short range RF transceiver and a predetermined mobile communications device assigned to a particular crew member. The method may also include transmitting vehicular data from the onboard short range RF transceiver to the predetermined mobile communications device.

In accordance with another embodiment, a method for close proximity vehicular data transmission may include establishing a communications link between a ground short range RF transceiver and a predetermined mobile communications device assigned to a particular crew member, wherein the ground short range transceiver is configured to transmit and receive signals within a limited distance from the ground short range transceiver. The method may also include validating the predetermined mobile communications device for receiving vehicular data for transfer to an onboard vehicle information system of a specific vehicle. Validating the mobile communications device may include determining that the predetermined mobile communications device is authorized to transfer vehicular data for the specific vehicle and that a request for transferring the vehicular data is within an expected time frame. The method may further include transmitting the vehicular data by the ground short range RF transceiver to the predetermined mobile communications device in response to validating the mobile communications device.

In accordance with a further embodiment, a system for close proximity vehicular data transmission may include a processor onboard a vehicle and the processor being configured to detect a predetermined condition of the vehicle. The system may also include a data storage device onboard the vehicle for storing vehicular operational data. The system may further include a short range radio frequency (RF) transceiver onboard the vehicle. The onboard short range RF transceiver may be activated in response to at least the predetermined condition being detected and the onboard short range RF transceiver being configured to transmit the vehicular operational data to a predetermined mobile communications device assigned to a particular crew member. The onboard short range RF transceiver is configured to transmit and receive signals within a limited distance from the onboard short range RF transceiver.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1A:
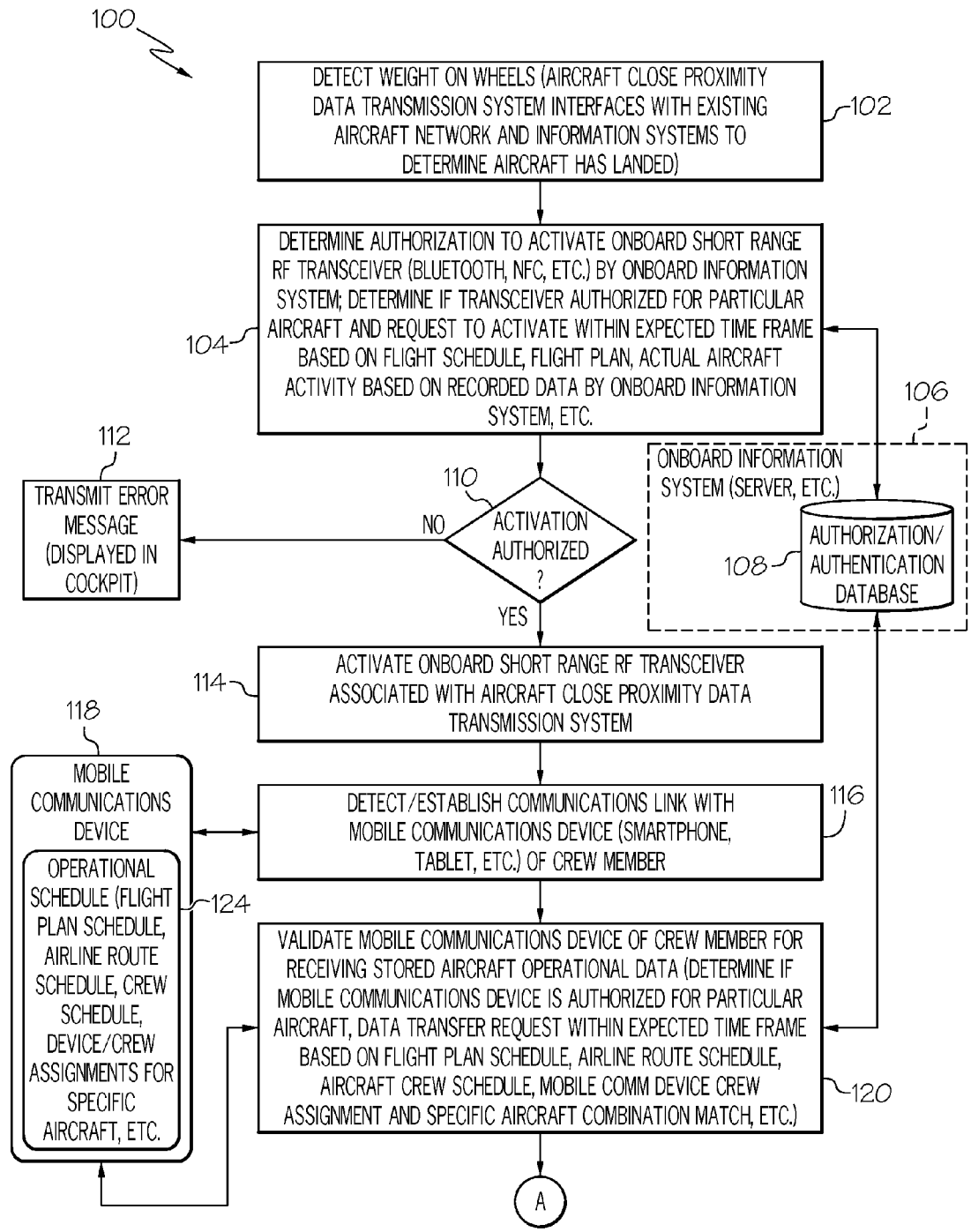
FIGS. 1A-1C (collectively FIG. 1) are flow chart of an example of a method for close proximity vehicular data transmission for transferring data off a vehicle in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1B:
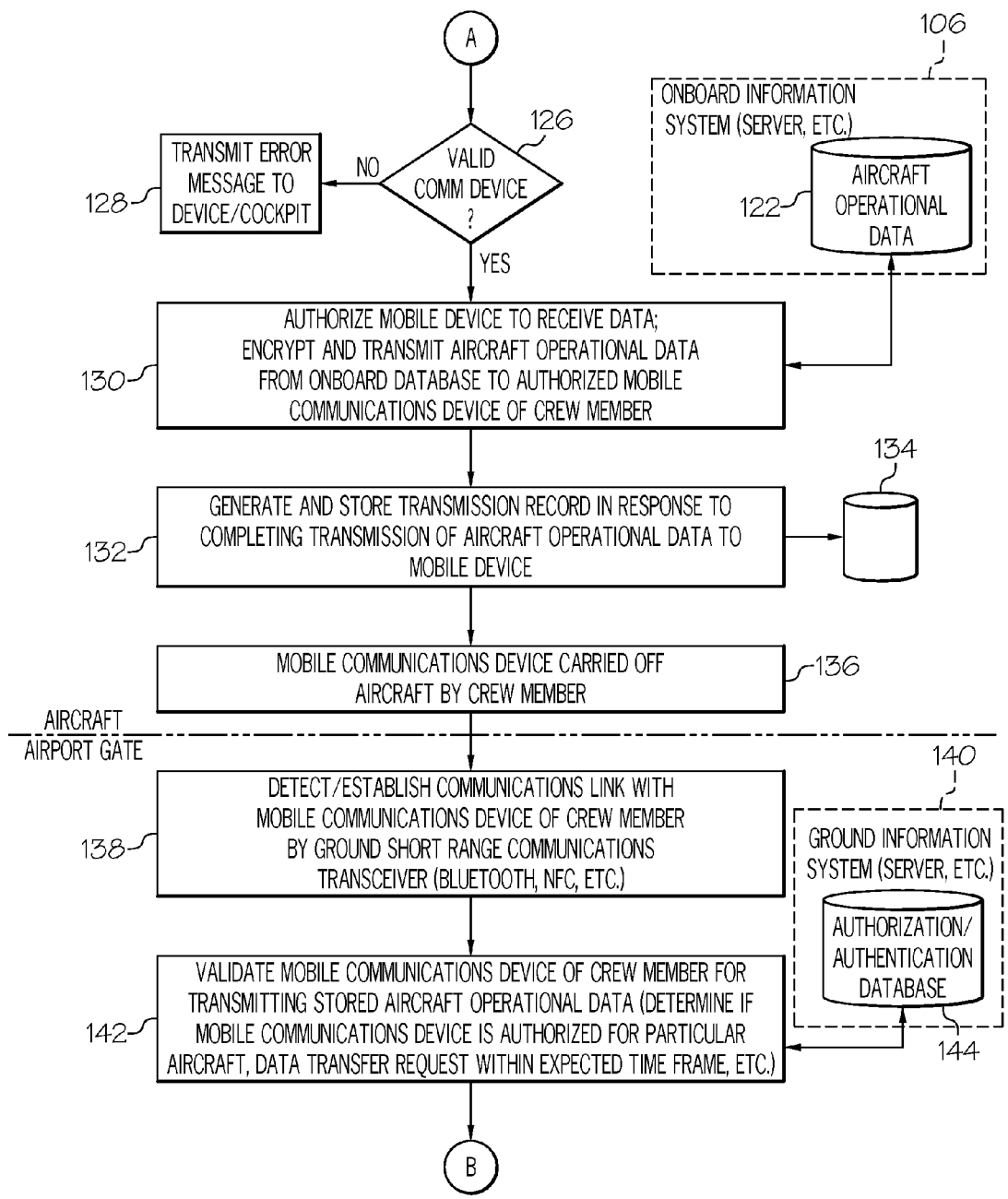
Figure 1C:
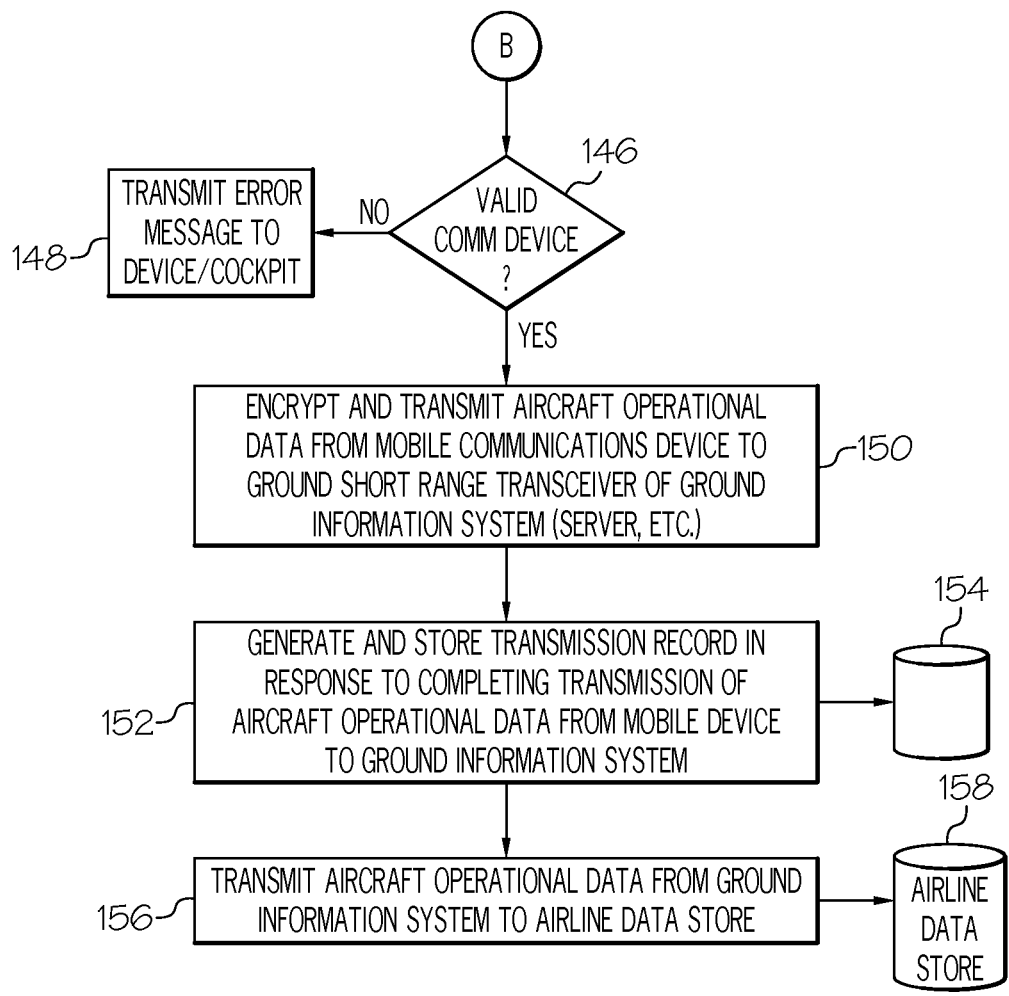

FIGS. 1A-1C (collectively FIG. 1) are flow chart of an example of a method 100 for close proximity vehicular data transmission for transferring data off a vehicle in accordance with an embodiment of the present disclosure. While the present invention may be described with reference to transferring vehicular data or aircraft operational data onto and off of an aircraft, those skilled in the art will recognize that the features and operations described may be applied to any type of vehicle or mode of transportation.

In block 102, a predetermined condition may be detected by a processor onboard the vehicle for activating a short range radio frequency (RF) transceiver onboard the vehicle. As described in more detail herein, the vehicle may be an aircraft and the predetermined condition may be a weight on wheels condition. An onboard information system or processor of the onboard information system may receive signals from a sensor or sensors indicating the weight on wheels condition. An aircraft onboard close proximity data transmission system or subsystem including the short range RF transceiver may interface with an existing aircraft network and information systems as described in more detail with reference to FIG. 4 to detect at least the weight on wheels and that the aircraft has landed.

The short range RF transceiver may be a Bluetooth or near field communication (NFC) transceiver or other type short range transceiver. Bluetooth technology exchanges data over short distances using radio transmissions. Bluetooth technology operates in the unlicensed industrial, scientific and medical (ISM) band at about 2.4 to about 2.485 Gigahertz (GHz), using a spread spectrum, frequency hopping, full-duplex signal at a nominal rate of 1600 hops/sec. The 2.4 GHz ISM band is available and unlicensed in most countries. Table 1 illustrates the data rates for different Bluetooth versions.

TABLE 1

| Version | Data rate | Maximum application throughput |
|---|---|---|
| Version 1.2 | 1 Mbit/s | >80 kbit/s |
| Version 2.0 + EDR | 3 Mbit/s | >80 kbit/s |
| Version 3.0 + HS | 24 Mbit/s | See Version 3.0 + HS. |
| Version 4.0 | | See Version 4.0LE. |

Table 2 illustrates the associated operating ranges for different classes of Bluetooth transceivers and the associated maximum transmitter power. Additionally, the operating ranges may be less in practice because of interference.

TABLE 2

| Class | Maximum Power | Operating Range |
|---|---|---|
| Class 1 | 100 mW (20 dBm) | 100 meters |
| Class 2 | 2.5 mW (4 dBm) | 10 meters |
| Class 3 | 1 mW (0 dBm) | 1 meter |

NFC is an offshoot of radio-frequency identification (RFID) with the exception that NFC is designed for use by devices within close proximity to each other. Three forms of NFC technology exist: Type A, Type B, and FeliCa (Felicity Card). All are similar but communicate in slightly different ways. FeliCa is commonly found in Japan. Like RFID, NFC works in the 13.56 Megahertz (MHz) radio frequency spectrum, using less than about 15 milliamps (mA) of power to communicate data over distances that are usually less than about 20 centimeters (cm). NFC devices typically store between about 96 and about 512 bytes of data and transfer data using at speeds of about 106 Kb/s, 212 Kb/s, 424 Kb/s or 848 Kb/s which may be enough to transfer small pieces of information virtually instantaneously. To ensure security, NFC often establishes a secure channel and uses encryption when sending sensitive information such as credit card numbers.

As described in more detail, because the short range RF transceiver onboard the aircraft is transmitting and receiving signals from a mobile communications device of one of the crew members of the aircraft, the short range RF transceiver may operate in a range of about 5 feet to about 20 feet or less. The range may be confined to within the aircraft or a particular area of the aircraft, such as the cockpit for security and to prevent unauthorized access or use of the short range RF transceiver.

In block 104, authorization to activate the onboard short range RF transceiver may be determined by the onboard information system 106 or processor of the onboard information system 106. The onboard information system 106 may include a server or processor as described with reference to FIG. 4 that is configured for performing the validation or authentication operations described herein. Determining the authorization to activate the onboard short-range RF transceiver may include determining if the transceiver is authorized for the particular aircraft and if a request to activate the onboard short range RF transceiver is within an expected time frame based on data that may include is not necessarily limited to a flight schedule of the particular aircraft, a flight plan of the particular aircraft, actual aircraft operational activity based on recorded data by the onboard information system and any other information that may be of use in determining if activation of the onboard short range RF transceiver may be authorized. Any changes to the flight schedule and/or flight plan may change the expected time frame for authentication/authorization of the device. An authorization/authentication database 108 may be associated with the onboard information system 106 for storing the authorization and authentication information described above that may be checked or compared by the onboard information system 106 for authorizing activation of the short range RF transceiver.

In block 110, a determination may be made if the activation of the short range RF transceiver was authorized in block 104. If activation was not authorized, the method 100 may advance to block 112 and an error message may be transmitted for presenting at least on a display in the cockpit. If the activation of the short range RF transceiver was authorized the method 100 may advance to block 114. In block 114, the onboard short-range RF transceiver may be activated. As described in more detail with reference to FIG. 4, the onboard short-range RF transceiver may be associated with an aircraft close proximity data transmission system or subsystem.

In block 116, a mobile communications device 118 of a crew member may be detected and a communications link may be automatically established between the onboard short range RF transceiver and the mobile communications device 118. The aircraft close proximity data transmission system may be configured such that the short range RF transceiver establishes the communications link with a predetermined or specific mobile communications device 118 assigned to a particular crew member of a specific aircraft. The predetermined mobile communications device 118 may be assigned to the particular crew member by the airlines, operator of the aircraft or other administrator. The mobile communications device 118 may be a smartphone, tablet computer or other mobile communications device that can perform the functions described herein and be carried off the aircraft by the crew member.

In block 120, the mobile communications device 118 of the crew member may be validated for receiving aircraft operational data 122. Validating the mobile communications device 118 may include determining if the mobile communications device 118 is authorized for the particular or specific aircraft and if the data transfer request is within an expected time frame. Determining if the data transfer request is within the expected time frame may be based on data 124 that may include but is not necessarily limited to the flight plan schedule of the particular aircraft, an airline route schedule, an aircraft crew schedule for the particular aircraft, mobile communications device to crew member assignments, a match between the mobile communications device to crew member assignment and the particular or specific aircraft and any other information that may be useful in validating that the particular mobile communications device of the crew member is authorized the for receiving the aircraft operational data for this specific aircraft. The crew member may also be required to enter a preset security code.

An authorization record may be generated in response to validating or authenticating the mobile communications device. An authorization record may be produced by an authorization system. The authorization record may be created at the time of a request to transmit vehicle or aircraft operational data 122 by the vehicle to the mobile communications device 118 of the crew member. The authorization record may be a specifically generated code by the authorization system. The code may be interpreted by the onboard information system 106 as authorization to transmit the data to the mobile communications device 118. The interpretation of the authorization code provides the details of what data is authorized to be transmitted from a specific vehicle to a specific device within a specific timeframe for a specific location.

In block 126, a determination may be made if the mobile communications device 118 of the crew member was validated. If the mobile communications device 118 was not validated, the method 100 may advance to block 128. In block 128, an error message may be transmitted to the mobile communications device and the cockpit or both for presentation on a display of the device and a cockpit display.

If the mobile communications device 118 was validated in block 120, the method 100 may advance to block 130. In block 130, the mobile communications device 118 is authorized to receive the aircraft operational data 122. The aircraft operational data 122 may be encrypted and transmitted from an onboard database to the authorized mobile communications device 118 of the crew member.

The aircraft operational data 122 may include, but is not necessarily limited to aircraft log files, aircraft electronic flight bag updates, aircraft electronic logbook updates, in-flight entertainment, airline operations update information, weather and navigation information or updates, and any other information useful in the operation of the aircraft.

In block 132, a transmission record may be generated and stored in response to completing transmission of the aircraft operational data 122 to the mobile communications device 118. The transmission record may be stored in a database 134. The transmission record may be a collection of metadata relative to the transmission of data from the vehicle or aircraft to the mobile communications device, or from a mobile communications device to the vehicle or aircraft, or mobile communications device to a stationary device. The metadata may include identification of the vehicle, a time of day, date, location of the device, location of the vehicle, assigned user of the mobile communications device, data transmitted, duration of the transmission, a start time of transmission, a stop time of transmission of the data, authorization to transmit the data and any additional information that may be of importance associated with the transmission of the data. The database 134 may be onboard the aircraft as part of the onboard information system or may be at a remote facility. In another embodiment, the transmission record may be stored in the database 134 onboard the aircraft and at a remote database, such as airline data store 158.

In block 136, the mobile communications device 118 may be carried off the aircraft by the crew member.

In block 138, the mobile communications device 118 of the crew member may be detected by a ground information system 140 that includes a ground short range RF communications transceiver (not shown in FIG. 1B). A communications link may be automatically established between the mobile communications device 118 and the ground short range RF communications transceiver.

In block 142, the mobile communications device 118 may be validated for transmitting the aircraft operational data stored on the mobile communications device 118 to the ground information system 140. Validating the mobile communications device 118 of the crew member may include determining if the mobile communications device 118 is authorized for the particular aircraft and if the data transfer request is within an expected time frame based on the flight plan schedule for the particular aircraft, the airline route schedule, the aircraft crew schedule, assignment of particular mobile communications devices to certain crew members, and a match between the mobile communications device to crew assignment and the specific aircraft. Any change in flight plan/flight schedule will result in a new expected time frame within which the device authentication/authorization is valid. An authorization/authentication database 144 may include the data described above for authorizing or authenticating the mobile communications device 118 by the ground information system. An authentication or authorization record similar to that previously described may also be generated in response to the mobile communications device 118 being validated and authorized for transmitting the aircraft operational data to the ground information system 140.

In block 146, a determination may be made if the mobile communications device 118 was validated. If the mobile communications device 118 was not validated, the method 100 may advance to block 148. In block 148, an error message may be transmitted to at least the mobile communications device. An error message may also be transmitted to a system or server of the airlines or aircraft owner for notification or alerting airline officials or security.

If the mobile communications device 118 was validated in block 142, the method 100 may advance to block 150. In block 150, the aircraft operational data may be encrypted and transmitted from the mobile communications device 118 to the ground short range RF transceiver of the ground information system 140.

In block 152, a transmission record similar to that previously described may be generated and stored in a database 154 associated with the ground information system 140 in response to completing the transmission of the aircraft operational data to the ground information system 140.

In block 156, the aircraft operational data may be transmitted from the ground information system 142 and airline data store 158. The airline data store 158 may be located at a remote airline office or facility.

The transfer of vehicular data is synchronized with the flight schedule. Also, the associated authentication, authorization of devices, etc. is valid only for that window of time or expected time frame. If the flight plan or schedule changes, this would cause a shift in the window of time or expected time frame either earlier or later. All systems are updated to be synchronized with the flight plan or schedule (either earlier or later depending on the flight plan or schedule change) at all times.

Figure 2A:
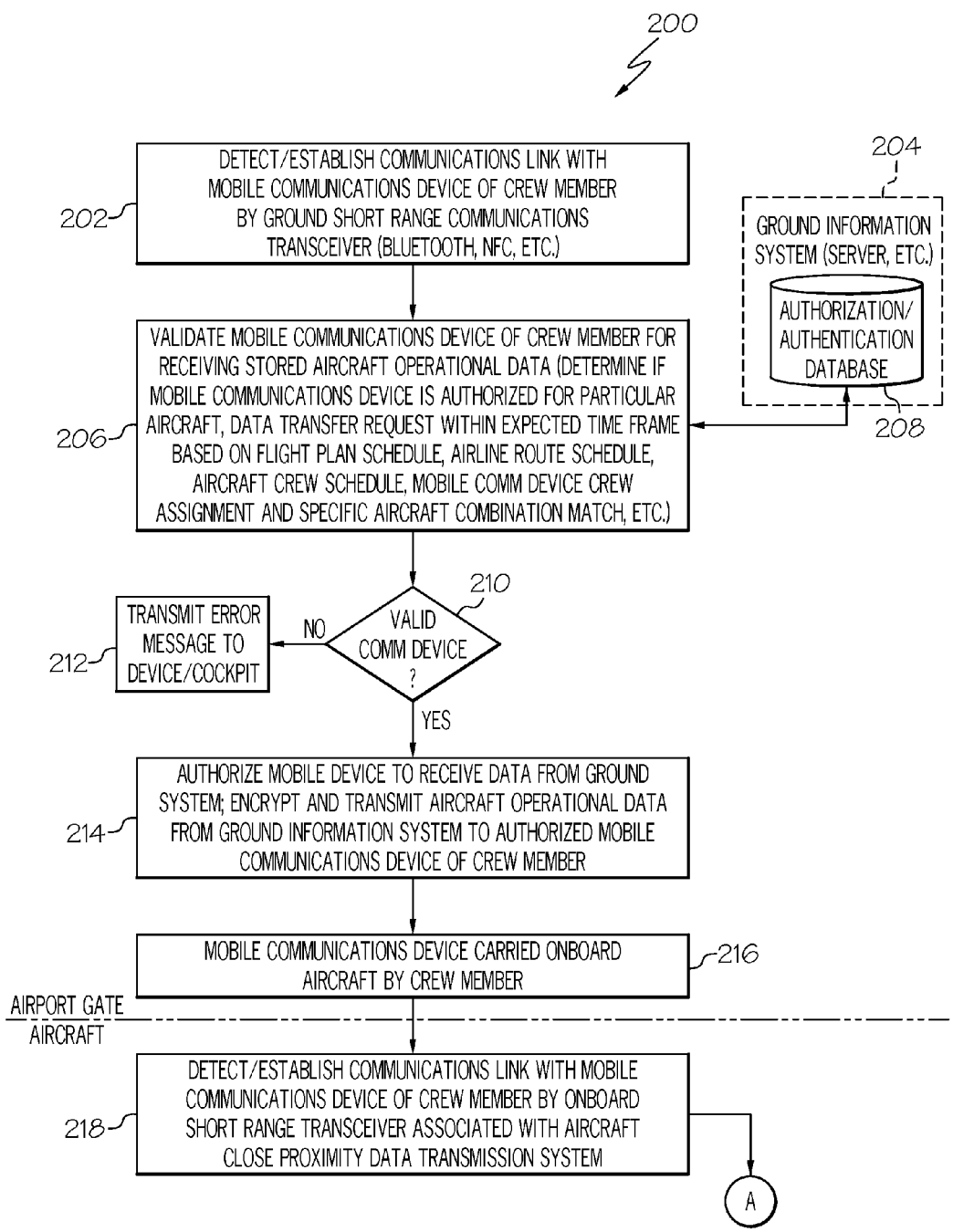
FIGS. 2A-2B (collectively FIG. 2) are a flow chart of an example of a method for close proximity vehicular data transmission for transferring data onto a vehicle in accordance with an embodiment of the present disclosure.
Figure 2B:
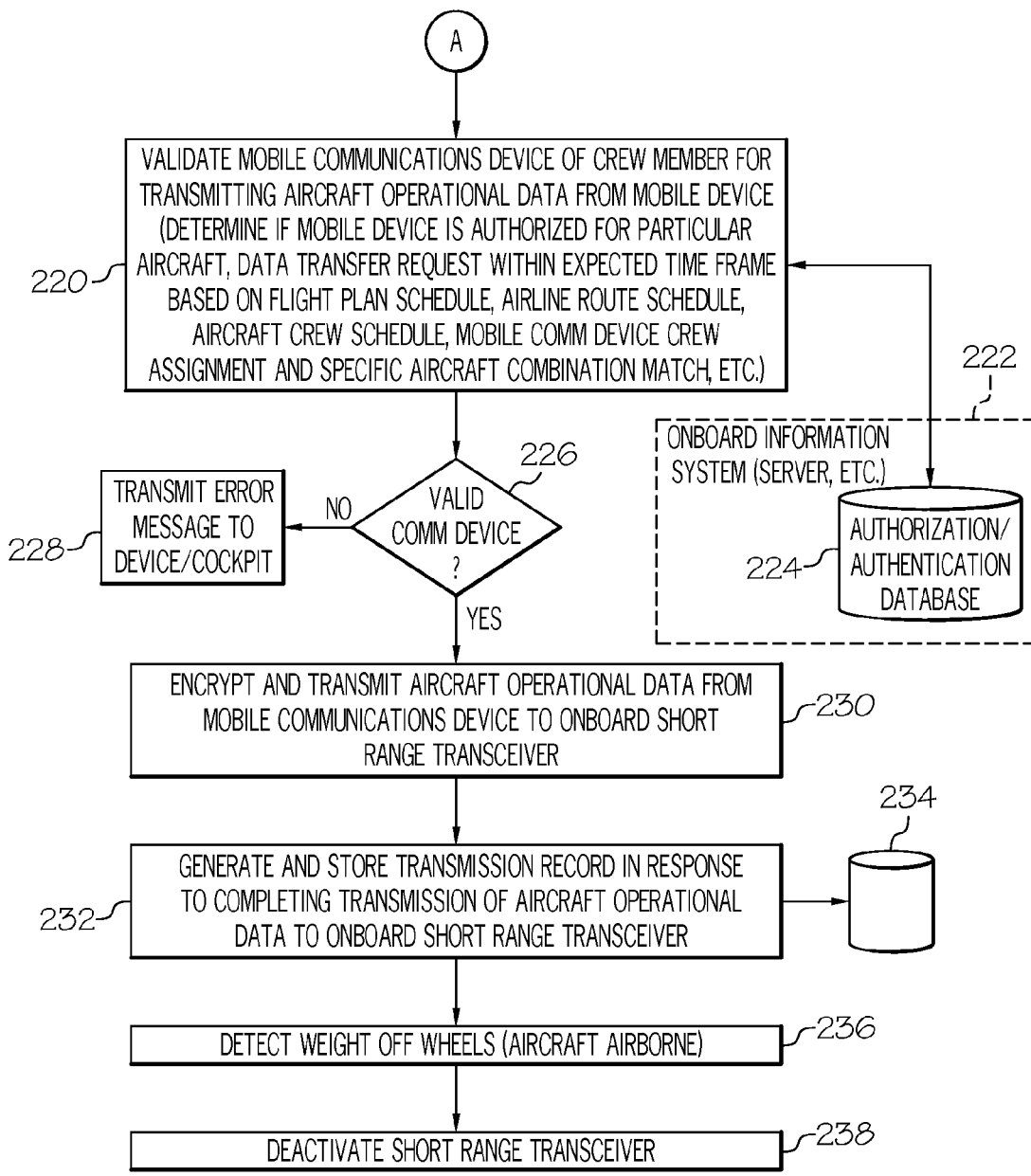

FIGS. 2A-2B (collectively FIG. 2) are a flow chart of an example of a method 200 for close proximity vehicular data transmission for transferring data onto the vehicle or aircraft in accordance with an embodiment of the present disclosure. In block 202, a mobile communications device of a crew member may be detected by a ground short range RF transceiver associated with a ground information system 204. The ground short range RF transceiver may be similar to that previously described. The mobile communications device may be a predetermined or specific mobile communications device assigned to a particular crew member of a specific aircraft. A communications link may be automatically established between the mobile communications device and the ground short range RF communications transceiver.

In block 206, the predetermined mobile communications device of the particular crew member may be validated for receiving stored aircraft operational data from the ground information system. The ground information system may include a server or other processing device. After receiving and storing the aircraft operational data, the mobile communications device may then be carried onboard the vehicle or aircraft by the crew member for transferring the stored aircraft operational data to an onboard information system. The mobile communications device may be validated by determining if the predetermined mobile communications device is authorized for the particular or specific aircraft, and if the data transfer request is within an expected time frame based on information including but not necessarily limited to a flight plan schedule of the particular aircraft, an airline route schedule, an aircraft crew schedule for the particular aircraft, assignment of the predetermined mobile communications device to a particular crew member, a match between the mobile communications device to crew assignment and the specific aircraft combination and any other information useful in authenticating and authorizing the mobile communications device to receive the aircraft operational data and to transfer the data to the onboard aircraft information system. The crew member may also be required to enter a preset security code. An authentic authorization/authentication database 208 may store the data described above for use in validating the mobile communications device for receiving the aircraft operational data. An authorization record similar to that previously described may be created in response to the mobile communications device being validated or authenticated.

In block 210, a determination may be made if the mobile communications device was validated in block 206. If the mobile communications device was not validated, the method 200 may advance to block 212. In block 212, an error message may be transmitted to the mobile communications device and may also be transmitted to an administrator, security or both for the airlines.

If the mobile communications device is validated in block 206, the method 100 may advance to block 214. In block 214, the mobile communications device may be authorized to receive the aircraft operational data from the ground information system 204. The aircraft operational data may be encrypted and transmitted from the ground information system to the authorized mobile communications device of the crew member by the short range RF transceiver in response to authorization of the mobile communications device. A transmission record similar to that previously described may be generated and stored by the ground information system in response to completion of transfer of the aircraft operational data to the authorized mobile communications device.

In block 216, the mobile communications device may be carried on board the aircraft by the crew member.

In block 218, the mobile communications device of the crew member may be detected by an onboard short range RF transceiver associated with an aircraft close proximity data transmission system or subsystem onboard the aircraft. The onboard short range RF transceiver may be similar to that previously described. A communications link may be automatically established between the mobile communications device and the onboard short range transceiver.

In block 220, the mobile communications device of the crew member may be validated for transmitting the aircraft operational data from the mobile communications device to the onboard information system 222 of the aircraft. The mobile communications device may be validated similar that previously described by determining if the mobile device is authorized for the particular or specific aircraft and whether the data transfer request is within the expected time frame. The expected time frame may be based on data including, but not necessarily limited to, the flight plan schedule of the particular aircraft, an airline route schedule, the aircraft crew schedule for the particular aircraft, assignment of the predetermined mobile communications device to a particular crew member and a match between the combination of the mobile communications device, crew member and the specific aircraft and any other data useful in authenticating the mobile communications device. Any change in flight plan/flight schedule would result in change of the expected time frame for which the device is deemed valid. An authorization/authentication database 224 may be associated with the onboard information system 222 and may include the data described above for validating the mobile communications device. The crew member may also be required to enter a preset security code. An authorization or authentication record similar that previously described may be generated and stored by the onboard information system in response to the mobile communications device being authenticated or authorized.

In block 226, a determination may be made if the communications device was validated. If the mobile communications device is not validated or authenticated, the method 200 may advance to block 228. In block 228, an error message may be transmitted to the mobile communications device and the cockpit. The error message may be presented on a display of the mobile communications device and on a display in the cockpit.

If the mobile communications device is validated in block 220, the method 200 may advance to block 230. In block 230 the aircraft operational data may be encrypted and transmitted from the mobile communications device to the onboard short range RF transceiver for storage by the onboard information system 222.

In block 232, a transmission record may be generated in response to completion of transferring the aircraft operational data from the mobile communications device to the short range RF transceiver. The transmission record may be stored in a database 234 associated with the onboard information system and/or another system or both, such as an airline data store 158.

In block 236, a weight off wheels condition of the aircraft may be detected indicating that the aircraft is airborne. In block 238, the short range RF transceiver may be deactivated in response to detecting the weight off wheels condition.

Figure 3:
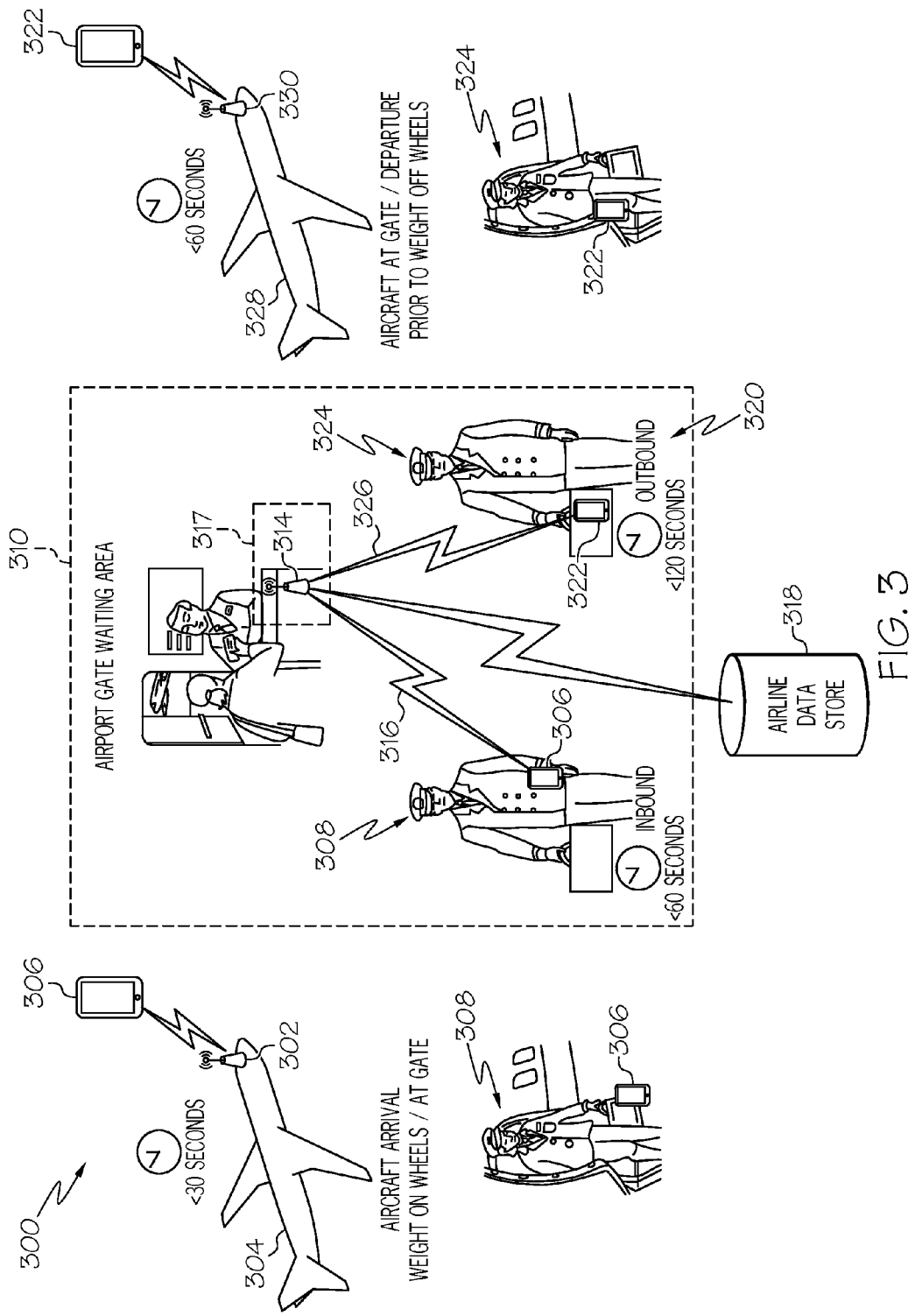
FIG. 3 is an illustration of an example of close proximity vehicular data transmission off of and onto an aircraft in accordance with an embodiment of the present disclosure.

FIG. 3 is an illustration of an example 300 of close proximity vehicular data transmission off of and onto an aircraft in accordance with an embodiment of the present disclosure. FIG. 3 is a representation of aspects of the methods 200 in FIGS. 2A-2C and 300 in FIGS. 3A-3B. The methods 200 and 300 may embodied in the systems and components illustrated in FIG. 3.

Aircraft operational data may be transferred by a short range RF transceiver 302 onboard the aircraft 304 to a predetermined or particular mobile communications device 306 assigned to a particular crew member 308. As previously discussed, the short range RF transceiver 302 may be authorized for activation in response to detecting the predetermined condition of detecting weight on the wheels of the aircraft. The aircraft operational data may be transferred by the onboard short range RF transceiver 302 to the predetermined mobile communications device 306 in response to validating the mobile communications device 306 of the crew member 308 similar to that previously described. The crew member 308 may then carry the mobile communications device 306 off the aircraft and into the airport terminal or airport gate waiting area 310.

A ground short range RF transceiver 314 may detect the mobile communications device 306 of the crew member 308 and may establish a communications link 316 between the ground short range RF transceiver 314 and the mobile communications device 306. The mobile communications device 306 may be validated or authenticated similar to that previously described by a ground information system 317 associated with the ground short range RF transceiver 314. The aircraft operational data may be transferred to the ground short range RF transceiver 314 in response to authentication of the mobile communications device 306. The aircraft operational data may be transferred by the ground information system 317 associated with the ground short range RF transceiver 314 to an airline data store 318. The airline data store 318 may be at a remote airline facility.

In the case of an outbound flight 320, the ground short range RF transceiver 314 may detect the mobile communications device 322 of an outbound crew member 324 and establish a communications link 326. The mobile communications device 322 of the outbound crew member 324 may be authenticated for receiving aircraft operational data from the ground short range RF transceiver 314 for transfer to an onboard aircraft information system. The mobile communication device 322 may be authenticated or validated similar to that previously described based on the data transfer request being within an expected time frame based on data including but not limited to the flight data schedule, airline route schedule, aircraft crew schedule, match between mobile communications device and crew member assignment and the specific aircraft. Any change in flight plan/flight schedule would result in change of the expected time frame for which the device is deemed valid. The aircraft operational data may be encrypted and transmitted to the mobile communications device 322 in response to authentication of the mobile communications device 322. The crew member 324 may then carry the mobile communications device 322 onboard the aircraft 328.

An onboard short range RF transceiver 330 may detect the mobile communications device 322 and establish a communications link with the mobile communications device 322. The aircraft operational data stored on the mobile communications device 322 may be transferred to the onboard short range RF transceiver 330 in response to authentication of the mobile communications device 322 in a manner similar to that previously described.

Figure 4:
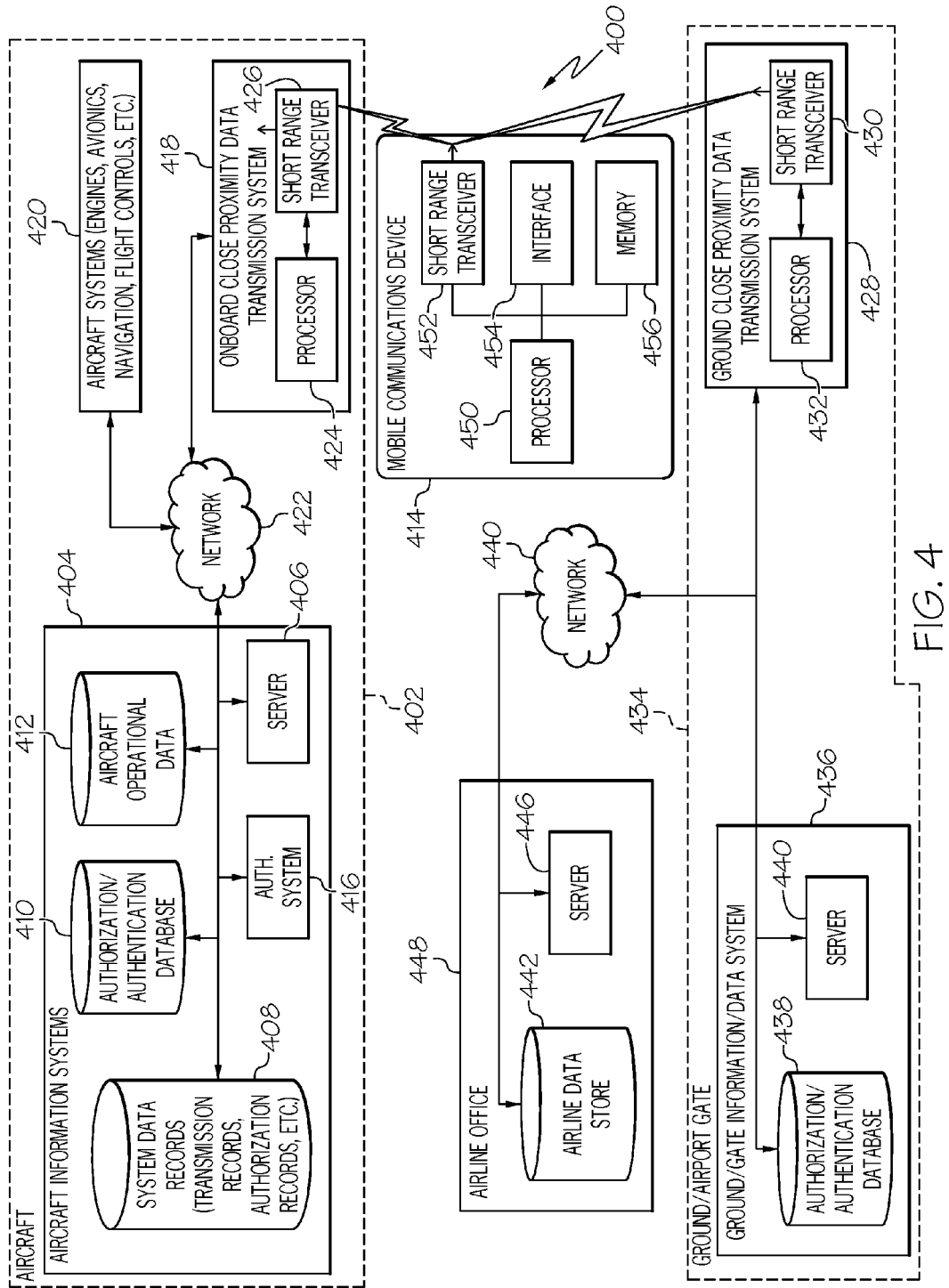
FIG. 4 is a block schematic diagram of an example of a system for close proximity vehicular data transmission in accordance with an embodiment of the present disclosure.

FIG. 4 is a block schematic diagram of an example of a system 400 for close proximity vehicular data transmission in accordance with an embodiment of the present disclosure. The method 200 in FIGS. 2A-2C and method 300 in FIGS. 3A-3B may be embodied in the system 400. The exemplary system 400 will be described with respect to the vehicle being an aircraft 402, although the elements and components described herein could also be used with other vehicles and mode of transportation.

The aircraft 402 may include an aircraft onboard information system or systems 404. The onboard information system 404 may include a server 406. The server 406 may be interconnected to a plurality of databases including, but not necessarily limited to a system data records database 408, an authorization/authentication database 410 and a database 412 for storing aircraft operational data. The system data records database 408 may include transmission records, authorization records or other data. Similar to that previously described, a transmission record may be a collection of metadata related to the transmission of data from the vehicle or aircraft to a mobile communications device 414 or from the mobile communications device 414 to the vehicle or aircraft 402. The metadata may include, but is not necessarily limited to, identification of the vehicle or aircraft 402, a time of day of transmission of the data, a calendar date of transmission of the data, a location of the mobile communications device 414 at the time of transmission, a location of the vehicle or aircraft 402 at the time of transmission of the data, an identification of the mobile communications device 414, an identification of the user or assigned crew member of the mobile communications device 414, information associated with the data that was transmitted, a duration of the transmission, a start time of the transmission, a stop time of the transmission, authorization to transmit the data, and any additional information that may be deemed material to the transmission record.

An authorization record may be produced by an authorization system 416. An authentication record may be created at the time of a request to transmit the aircraft operational data 412 and may include an identification of the vehicle or aircraft 402 requesting to transmit data or a mobile communications device 414 requesting authorization to transmit the data. The authorization record may be specifically generated code by the authorization system 416. This code may be interpreted by the vehicle or aircraft 402 and the mobile communications device 414 for authorization to transmit data. The interpretation of the authentication code may provide the details of what data is authorized to be transmitted from a specific vehicle or aircraft 402 to a specific mobile communications device 414 or vice versa within a specific time frame for a specific location.

The authorization/authentication database 410 may include data for authenticating and authorizing the mobile communications device 414 and to confirm that the request for transferring data is within an expected time frame based on data stored in the authorization/authentication database 410. For example, the data may include but is not necessarily limited to a flight schedule of the aircraft, a flight plan of the aircraft, aircraft operational activity recorded by the onboard information systems 404, and aircraft crew schedule, a mobile communications device to crew assignment and combination mobile communications device to crew assignment and specific aircraft assignment information.

The aircraft 402 may also include an onboard close proximity data transmission system or subsystem 418 and other aircraft systems 420. The other aircraft systems 420 may include, but are not necessarily limited to engine systems, flight control systems, navigation systems, communications systems, avionics systems and other systems for operation of the aircraft. The onboard aircraft information system or systems 404, onboard close proximity data transmission system 418 and the other aircraft systems 420 may be communicatively and operatively interconnected by an onboard network 422.

The onboard close proximity data transmission system 418 may include a processor 424 and short range RF transceiver 426. The processor 424 may be configured to control operation of the short range RF transceiver 426 so that the transceiver is only active under certain predetermined conditions, such as a wheels down condition of the aircraft and is authorized to transmit and receive data during certain time periods as described herein. The short range RF transceiver 426 may be a Bluetooth, NFC or other short range transceiver. The range of the transceiver 426 may be limited to a preset distance, such as within about 5 feet or substantially within the aircraft or within a particular portion of the aircraft, such as the cockpit or flight deck since the short range RF transceiver 426 is configured to transmit and receive data from the mobile communications device 414 of the crew member onboard the vehicle or aircraft 402.

The system 400 may also include a ground close proximity transmission system 428 or subsystem. The ground close proximity data transmission system 428 may include a short range RF transceiver 430 and a processor 432 for controlling operation of the short range RF transceiver 430. The short range RF transceiver 430 may be similar to the onboard short range transceiver 426 but may operate at a higher power and therefore include a much larger operating range than the onboard short range transceiver 426. For example, the ground short range RF transceiver may have an operating range between about 5 feet and about 20 feet. The ground close proximity data transmission subsystem 428 may be located at an airport gate 434.

A ground or gate information system 436 may be associated with the ground close proximity data transmission subsystem 428. The ground or gate information system 436 may include an authorization/authentication database 438 and a server 440. The ground or gate information system 436 may authenticate the mobile communications device 414 for transmitting and receiving aircraft operational data similar to that previously described.

The ground or gate information system 436 may be connected to an airline data store 442 by a network 444. The network 444 may be the Internet or other public or private network. A server 446 may be associated with the airline data store 442 for processing the aircraft operational data received from or transmitted to the ground information system 436. The airline data store 442 may also transmit data to the ground or gate information data system 436. Similar to that previously described the data may be transferred by the ground short range transceiver 430 to the mobile communications device 414. The mobile communications device 414 may then be carried onto the aircraft 402 by an authorized crew member and the aircraft operational data may be transferred to the onboard aircraft information system 404 via the onboard close proximity data transmission subsystem 418. The airline data store 442 may transmit and receive aircraft operational data from a plurality of ground information data systems 436 located at multiple different airports in different geographical areas. There may also be multiple ground information data systems 436 located at an airport. For example, a ground information system 436 and an associated short range transceiver 430 may be located at each gate of an airport. In another embodiment, a short range transceiver 430 or close proximity data transmission system 428 may be located at each gate of an airport and each of the transceivers 430 or systems 428 may be communicatively interconnected to a single ground information system 436 at the airport. The airline data store 442 and server 446 may be located at a remote airline office 448.

The mobile communication device 414 may be a smartphone, tablet computer or other mobile communications device capable of performing the operations described herein. The mobile communications device 414 may include a processor 450, a short range transceiver 452, a user interface 454 and a memory 456 as well as other components. The short range transceiver 452 is compatible with the onboard short range transceivers 426 and the ground short range transceiver 430 for transmitting and receiving aircraft operational data similar to that described herein. The memory 456 may be configured to store the aircraft operational data for transferring the aircraft operational data off and onto the aircraft 402 as described herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for close proximity vehicular data transmission, comprising:

detecting, by a processor onboard a vehicle, a predetermined condition for activating a short range radio frequency (RF) transceiver onboard the vehicle, wherein the onboard short range RF transceiver is configured to transmit and receive signals within a limited distance from the onboard short range RF transceiver;

activating, by the processor, the onboard short range RF transceiver in response to at least detecting the predetermined condition, wherein the vehicle is an aircraft and wherein activating the onboard short range RF transceiver comprises activating the onboard short range RF transceiver in response to detecting a weight on wheels condition of the aircraft;

establishing a communications link between the onboard short range RF transceiver and a predetermined mobile communications device assigned to a particular crew member; and transmitting vehicular data from the onboard short range RF transceiver to the predetermined mobile communications device.

2. The method of claim 1, wherein activating the onboard short range RF transceiver further comprises activating the onboard short range RF transceiver in response to detecting the weight on wheels condition of the aircraft and a request to activate the onboard short range RF transceiver being within an expected time frame based on at least one of a flight schedule of the aircraft, a flight plan of the aircraft and aircraft operational activity recorded by an onboard information system.

3. The method of claim 1, further comprising determining authorization to activate the onboard short range RF transceiver in response to detecting the predetermined condition.

4. The method of claim 3, wherein detecting the predetermined condition comprises detecting the weight on wheels condition of the aircraft and determining authorization to activate the onboard short range RF transceiver comprises determining that activation of the onboard short range RF transceiver is within an expected time frame based on at least one of a flight schedule of the aircraft, a flight plan of the aircraft and aircraft operational activity recorded by an onboard information system, wherein a change in the flight plan or the flight schedule of the aircraft results in a change of the expected time frame.

5. The method of claim 4, further comprising:
activating the onboard short range RF transceiver in response to detecting the weight on wheels condition of the aircraft and the activation of the onboard short range RF transceiver being within the expected time frame; and
transmitting an error message to at least a cockpit display in response to activation of the onboard short range RF transceiver not being authorized.

6. The method of claim 1, further comprising validating the predetermined mobile communications device prior to transmitting the vehicular data.

7. The method of claim 6, wherein validating the predetermined mobile communications device comprises determining if the predetermined mobile communications device is authorized for a particular vehicle on which the predetermined mobile communication device is currently onboard.

8. The method of claim 6, wherein validating the predetermined mobile communications device comprises:
determining if the predetermined mobile communications device is authorized for a particular vehicle on which the predetermined mobile communication device is currently onboard; and
determining if a data transfer request to the predetermined mobile communications device is within an expect time frame.

9. The method of claim 8, wherein the vehicle is a specific aircraft and wherein the method further comprises determining the expected time frame based on at least one of a flight plan schedule for the specific aircraft, an airline route schedule, an aircraft crew schedule, a mobile communications device to crew assignment and a match between the mobile communication device to crew assignment and the specific aircraft.

10. The method of claim 1, further comprising establishing a communications link between the mobile communications device and a ground short range RF transceiver in response to the particular crew member carrying the mobile communications device off the vehicle, wherein the ground short range RF transceiver is configured to transmit and receive signals within a limited distance from the ground short range RF transceiver.

11. The method of claim 10, further comprising:
validating the mobile communications device for transmitting the vehicular data to the ground short range RF transceiver, wherein validating the mobile communications device comprises determining that the mobile communications device is authorized for transferring the vehicular data of the vehicle and that a request for transferring the vehicular data is within an expected time frame; and
transmitting the vehicular data to the ground short range RF transceiver in response to validating the mobile communications device.

12. The method of claim 11, wherein the vehicle is an aircraft, the method further comprising transmitting the vehicular data to an airline data store.

13. A method for close proximity vehicular data transmission, comprising:
establishing a communications link between a ground short range RF transceiver and a predetermined mobile communications device assigned to a particular crew member, wherein the ground short range transceiver is configured to transmit and receive signals within a limited distance from the ground short range transceiver;
validating the predetermined mobile communications device for receiving vehicular data for transfer to an onboard vehicle information system of a specific vehicle, wherein validating the predetermined mobile communications device comprises determining that the predetermined mobile communications device is authorized to transfer vehicular data for the specific vehicle and that a request for transferring the vehicular data is within an expected time frame; and
transmitting the vehicular data by the ground short range RF transceiver to the predetermined mobile communications device in response to validating the predetermined mobile communications device.

14. The method of claim 13, further comprising:
establishing a communications link between a short range RF transceiver onboard the specific vehicle and the predetermined mobile communications device in response to the particular crew member boarding the specific vehicle;
validating the predetermined mobile communications device for transmitting the vehicular data to the onboard vehicle information system, wherein validating the predetermined mobile communications device comprises determining if the predetermined mobile communications device is authorized for the specific vehicle on which the predetermined mobile communication device is currently onboard; and
transmitting the vehicular data from the predetermined mobile communications device to the onboard short range RF transceiver in response to validating the predetermined mobile communications device.

15. The method of claim 14, wherein the vehicle is an aircraft, the method further comprising:
   detecting a weight off wheels condition of the aircraft; and
   deactivating the onboard short range RF transceiver in response to detecting the weight off wheels condition of the aircraft.

16. A system for close proximity vehicular data transmission, comprising:
   a processor onboard a vehicle, the processor being configured to detect a predetermined condition of the vehicle;
   a data storage device onboard the vehicle for storing vehicular operational data;
   a short range radio frequency (RF) transceiver onboard the vehicle, the onboard short range RF transceiver being activated in response to at least the predetermined condition being detected and the onboard short range RF transceiver being configured to transmit the vehicular operational data to a predetermined mobile communications device assigned to a particular crew member, wherein the onboard short range RF transceiver is configured to transmit and receive signals within a limited distance from the onboard short range RF transceiver, wherein the vehicle is an aircraft and the onboard short range RF transceiver is activated in response to detecting a weight on wheels condition of the aircraft.

17. The system of claim 16, wherein the onboard short range RF transceiver is activated in response to detecting the weight on wheels condition of the aircraft and a request to activate the onboard short range RF transceiver being within an expected time frame based on at least one of a flight schedule of the aircraft, a flight plan of the aircraft and aircraft operational activity recorded by an onboard information system, wherein a change in a flight plan or a flight schedule results in a change of the expected time frame for which the RF transceiver is deemed valid.

18. The system of claim 16, wherein the predetermined mobile communications device is validated prior to transmitting the vehicular operational data, the predetermined mobile communications device is validated by determining if the predetermined mobile communications device is authorized for a particular vehicle on which the predetermined mobile communication device is currently onboard and by determining if a data transfer request to the predetermined mobile communications device is within an expect time frame.

19. The system of claim 18, wherein the vehicle is a specific aircraft and the expected time frame is determined based on at least one of a flight plan schedule for the specific aircraft, an airline route schedule, an aircraft crew schedule, a mobile communications device to crew assignment and a match between the mobile communication device to crew assignment and the specific aircraft, wherein a change in a flight plan or a flight schedule results in a change of the expected time frame for which the predetermined mobile communications device is deemed valid.

20. The system of claim 16, further comprising a ground short range RF transceiver configured to establish a communications link with the predetermined mobile communications device in response to the particular crew member carrying the mobile communications device off the vehicle and the mobile communications device being detected, the vehicular operational data being transmitted from the predetermined mobile communications device to the ground short range RF transceiver in response to validating the predetermined mobile communications device, wherein the ground short range RF transceiver is configured to transmit and receive signals within a limited distance from the ground short range RF transceiver.

* * * * *